(12) United States Patent
Ebihara et al.

(10) Patent No.: US 10,349,013 B2
(45) Date of Patent: Jul. 9, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Masakazu Ebihara, Tokyo (JP); Kazunori Sakaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/760,672

(22) PCT Filed: Oct. 4, 2016

(86) PCT No.: PCT/JP2016/079387
§ 371 (c)(1),
(2) Date: Mar. 16, 2018

(87) PCT Pub. No.: WO2017/073252
PCT Pub. Date: May 4, 2017

(65) Prior Publication Data
US 2018/0262718 A1    Sep. 13, 2018

(30) Foreign Application Priority Data
Oct. 27, 2015 (JP) ................................. 2015-210937

(51) Int. Cl.
*H04N 5/232* (2006.01)
*H04N 7/18* (2006.01)
(Continued)

(52) U.S. Cl.
CPC ........... *H04N 7/181* (2013.01); *G06K 9/4652* (2013.01); *H04N 5/232* (2013.01); *H04N 5/247* (2013.01);
(Continued)

(58) Field of Classification Search
CPC ........ H04N 7/181; H04N 5/232; H04N 5/247; H04N 9/04; H04N 9/64; H04N 9/73
(Continued)

(56) References Cited

U.S. PATENT DOCUMENTS

2013/0114854 A1    5/2013  Yoneyama

FOREIGN PATENT DOCUMENTS

JP    2002-190014 A    7/2002
JP    2004-349951 A    12/2004
(Continued)

OTHER PUBLICATIONS

JP2002190014 Translation (Year: 2002).*
JP2004349951 Translation (Year: 2004).*
JP2013098935 Translation (Year: 2013).*
JP2015184810 Translation (Year: 2015).*
WO2014021005 Translation (Year: 2014).*
(Continued)

*Primary Examiner* — Nguyen T Truong
(74) *Attorney, Agent, or Firm* — Oblon, McClelland, Maier & Neustadt, L.L.P.

(57) ABSTRACT

An information processing apparatus according to the present disclosure includes: a reception unit configured to receive image-capturing information from each of a plurality of imaging apparatuses; and a color conversion information calculation unit configured to calculate, on a basis of the received image-capturing information, color conversion information for matching hues of the plurality of imaging apparatuses. With this arrangement, it is possible to prevent, in the case where a specific target entity is recognized from images captured by a plurality of cameras, variation in image information acquired between the cameras. With such arrangement, it is possible to prevent, in the case where a specific target entity is recognized from images captured by a plurality of cameras, variation in image information acquired between the cameras.

9 Claims, 11 Drawing Sheets

(51) Int. Cl.
  *H04N 9/04*    (2006.01)
  *H04N 9/73*    (2006.01)
  *G06K 9/46*    (2006.01)
  *H04N 5/247*   (2006.01)
  *H04N 9/64*    (2006.01)
  *H04N 17/00*   (2006.01)

(52) U.S. Cl.
  CPC ............... *H04N 9/04* (2013.01); *H04N 9/64* (2013.01); *H04N 9/73* (2013.01); *H04N 17/002* (2013.01)

(58) Field of Classification Search
  USPC ........................................................ 348/159
  See application file for complete search history.

(56) References Cited

FOREIGN PATENT DOCUMENTS

| | | |
|---|---|---|
| JP | 2009-199322 A | 9/2009 |
| JP | 2013-98935 A | 5/2013 |
| JP | 2015-184810 A | 10/2015 |
| WO | WO 2014/021005 A1 | 2/2014 |

OTHER PUBLICATIONS

International Search Report dated Dec. 20. 2016 in PCT/JP2016/079387, 2 pages.

\* cited by examiner

INFORMATION PROCESSING APPARATUS, INFORMATION PROCESSING METHOD, AND PROGRAM

TECHNICAL FIELD

The present disclosure relates to an information processing apparatus, an information processing method, and a program.

BACKGROUND ART

Conventionally, for example, as described in Patent Literature 1 below, an inter-camera tracking/search function has been proposed that tracks/searches for the same person from videos between a plurality of cameras on the basis of camera position information, time, features (clothing color) of a culprit, or the like.

CITATION LIST

Patent Literature

Patent Literature 1: JP 2009-199322A

DISCLOSURE OF INVENTION

Technical Problem

Recent years have seen an explosive increase in security cameras, and it is said that the recording time of videos has already exceeded a trillion hours a year. This trend is going to accelerate, and the recording time is expected to be several times as long as the current recording time in a few years. In spite of these circumstances, however, operators visually search (i.e., reproduce and check) vast quantities of recorded videos one by one in most cases even today, when some emergency like accidents occurs. This is unfortunately increasing the personnel costs of operators year by year.

Even in the case where the function as described in Patent Literature 1 above is used, variation in color information or the like between a plurality of cameras problematically causes the matching accuracy of the same person to decrease, and disturbs the performance of the search itself.

It is then desired to prevent, in the case where a specific target entity is recognized from images captured by a plurality of cameras, variation in image information acquired between the cameras.

Solution to Problem

According to the present disclosure, there is provided an information processing apparatus including: a reception unit configured to receive image-capturing information from each of a plurality of imaging apparatuses; and a color conversion information calculation unit configured to calculate, on a basis of the received image-capturing information, color conversion information for matching hues of the plurality of imaging apparatuses.

An image color conversion unit configured to use the color conversion information for each of the plurality of imaging apparatuses to convert hues of images captured by the plurality of imaging apparatuses may be further included.

In addition, the color conversion information calculation unit may use a hue of a specific imaging apparatus among the plurality of imaging apparatuses as a standard, and calculate, on a basis of a hue of another imaging apparatus other than the specific imaging apparatus and the hue of the specific imaging apparatus, the color conversion information for each of the plurality of imaging apparatuses.

In addition, an imaging parameter creation unit configured to create, on a basis of the color conversion information for each of the plurality of imaging apparatuses, an imaging parameter regarding imaging of each of the plurality of imaging apparatuses; and a transmission unit configured to transmit the imaging parameter to each of the plurality of imaging apparatuses to allow the plurality of imaging apparatuses to perform imaging with the imaging parameter may be further included.

In addition, the image-capturing information may include image-capturing environment information regarding an image-capturing environment when each of the plurality of imaging apparatuses captures an image, and a parameter regarding image-capturing which is specific to each of the plurality of imaging apparatuses.

In addition, a candidate object computing unit configured to compute, on a basis of a hue of a tracking target object whose image is captured by any of the plurality of imaging apparatuses, a candidate object similar to the tracking target object from an image captured by at least any of the plurality of imaging apparatuses may be further included.

In addition, a display processing unit configured to perform, on a basis of a degree of similarity between the tracking target object and the candidate object, processing for displaying a list of the candidate objects may be further included.

In addition, according to the present disclosure, there is provided an information processing method including: receiving image-capturing information from each of a plurality of imaging apparatuses; and calculating, on a basis of the received image-capturing information, color conversion information for matching hues of the plurality of imaging apparatuses.

In addition, according to the present disclosure, there is provided a program for causing a computer to function as: a means for receiving image-capturing information from each of a plurality of imaging apparatuses; and a means for calculating, on a basis of the received image-capturing information, color conversion information for matching hues of the plurality of imaging apparatuses.

Advantageous Effects of Invention

As described above, according to the present disclosure, it is possible to prevent, in the case where a specific target entity is recognized from images captured by a plurality of cameras, variation in image information acquired between the cameras.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
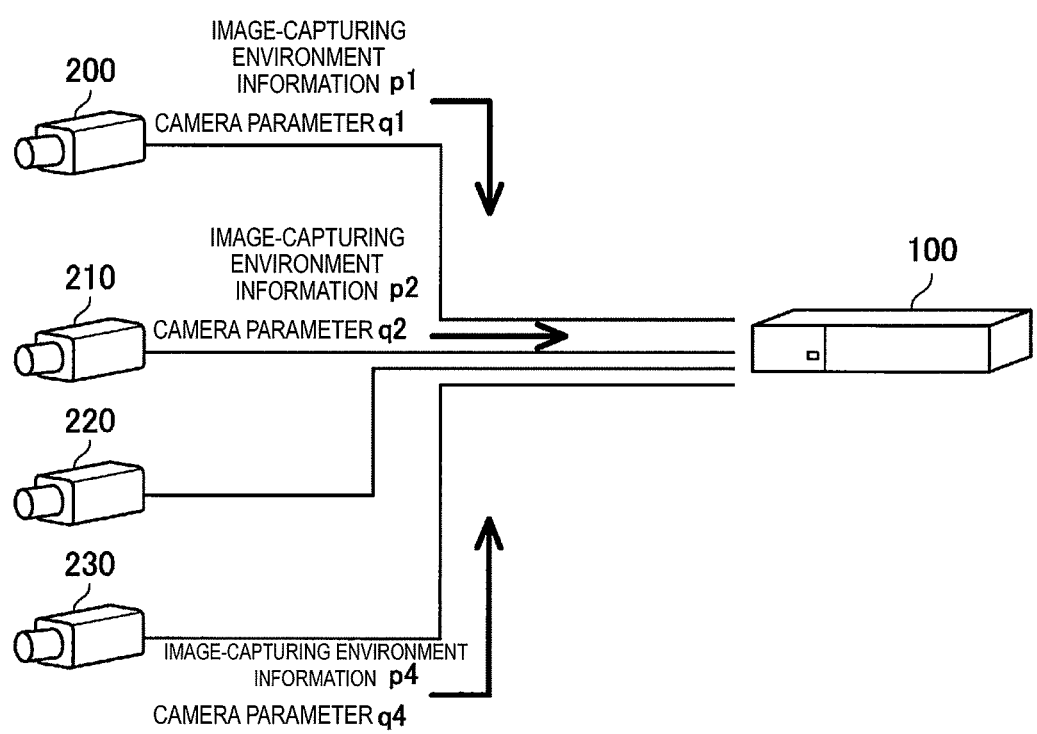
FIG. 1 is a schematic diagram illustrating a configuration of a surveillance camera system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.
1. Prerequisite Technology
2. Example of User Interface
3. Flow of Processing Performed In Surveillance Camera System
4. Processing Performed When Candidate Object Is Computed
5. Regarding Color Conversion Matrix
6. Example of Component of Video Management Server
7. Example of Component of Surveillance Camera
8. Example of Component for Computing Similar Object
1. Prerequisite Technology In spite of a recent explosive increase in security cameras as described above, operators visually search (such as reproducing and checking) vast quantities of recorded videos of culprits one by one in most cases even today, when some emergency like accidents occurs. This is unfortunately increasing the personnel costs of operators year by year.

For this, it is possible to reduce the workloads of an operator by using an inter-camera tracking search function of tracking and searching for the same person from videos between a plurality of cameras on the basis of camera position information, incident occurrence time, features (clothing color) of a culprit, or the like.

However, there are still problems in spite of the use of these functions, and it is not possible in some cases to reduce the work hours of operators. The following uses, as an example, the workflow in the case of searching for an escape route or the like of a culprit after an incident occurs from a plurality of cameras in accordance with the flow from the following steps S1 to S4, and describes problems thereof.

Step 1: An accident occurs in an area monitored by a surveillance camera

Step 2: Time is narrowed down from a surveillance camera of the area in which an incident occurs, and a culprit is discovered from the incident video.

Step 3: Search information (camera position, time, advancing direction of the culprit, clothing color of the culprit, or the like) is input on the basis of the culprit discovered in step 2, and an inter-camera search function is executed Step 4: The search function searches the video recorded by a peripheral camera, and outputs a result Step 5: A target person is visually checked from a group of search results (thumbnails and time line tags) one by one which is output from the search function in step 4, the culprit is identified, and an escape route is found The problematic phase in the above flow is step 4. A thumbnail itself which is output in step 4 is output by preferentially selecting a person who can be the same as a person recorded by the peripheral camera on the basis of the features of the culprit discovered in step 2. Such a function narrows down search places from the camera positions, and narrows down search time from the incident discovery time to make a same-person determination. However, persons are finally narrowed down on the basis of a clothing color or the like. With respect to color, however, even the same color is recorded in a video as a different color because of influence under weather, a sunlight condition, a special light source, or the like. For example, a person who wears orange clothing normally looks like the person wears orange clothing in a certain surveillance camera, but the person who wears orange clothing sometimes looks like the person wears yellow clothing in another surveillance camera because the person is under a mercury lamp. Therefore, the same color looks different in a search between a plurality of cameras because of different light sources unless the camera installation environments are precisely grasped. Accordingly, the matching accuracy of the same person is decreased when a search base on color is conducted. In addition, the performance of the search itself is sometimes disturbed.

Therefore, in the present embodiment, when a camera is linked to a server to conduct a search using color, variation in color between cameras is automatically corrected, and the accuracy of matching persons in the search is increased. The detailed description will be made below.

FIG. 1 is a schematic diagram illustrating the configuration of a surveillance camera system 1000 according to an embodiment of the present disclosure. As illustrated in FIG. 1, the surveillance camera system 1000 includes a video management server 100, and a plurality of surveillance cameras 200, 210, 220, and 230. The video management server 100, and the plurality of surveillance cameras 200, 210, 220, and 230 are connected to each other via a network or the like. A video captured by each of the surveillance cameras 200, 210, 220, and 230 is sent to the video management server 100. The video management server 100 manages a video captured by each of the surveillance cameras 200, 210, 220, and 230. The video management server 100 side designates a specific person, thereby allowing the inter-camera search function to search the video captured by each of the surveillance cameras 200, 210, 220, and 230 for a person who matches the designated specific person.

2. Example of User Interface

Figure 2:
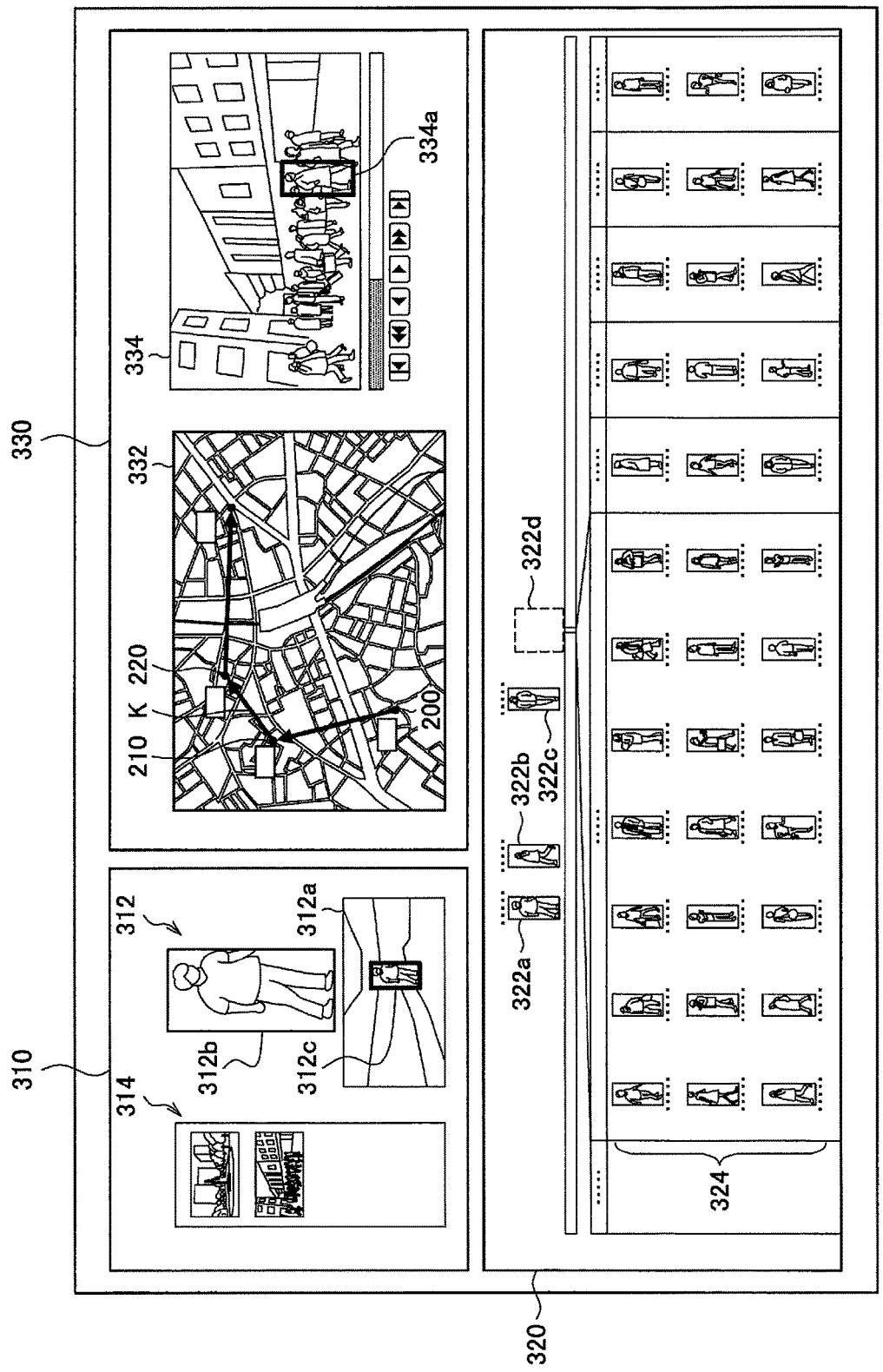
FIG. 2 is a schematic diagram illustrating an example of a user interface of a system for tracking a specific person from videos captured by a plurality of surveillance cameras.

FIG. 2 illustrates an example of a user interface of a system for tracking a specific person from videos captured by the plurality of surveillance cameras 200, 210, 220, and 230. As an example, the interface illustrated in FIG. 2 is displayed on a display unit of the video management server 100.

The user interface in FIG. 2 includes a panel 310 that displays a tracking target object (key object) designated by a user, a panel 320 that displays a result obtained by performing tracking processing, and a panel 330 that displays which route the tracked tracking target object takes on a map and reproduces a scene in which the object appears. As an example, the display unit of the video management server 100 includes a touch sensor, and a user is able to perform a desired operation by touching the user interface in FIG. 2.

The panel 310 is a panel that always displays a key object designated in advance by a user, and allows the user to check the key object. This panel roughly includes a current key object information unit 312 and a key object history unit 314. The current key object information unit 312 is an area in which it is possible to check the currently designated key object (current key object). In the current key object information unit 312, an area 312a shows the overall view at the point of time when a user designates a key object from the recorded camera video. An area 312b magnifies and displays a rectangular area 312c designated by a user. The key object history unit 314 is the overall image of past key objects which is displayed in the case where a plurality of searches are conducted. In the case where a key object is set again, the image of the area 312a is stored in this key object history unit 314, and displayed.

The panel 320, which displays a tracking result, is a panel that displays a result obtained by computing a candidate object. On the area that represents time with a slider 322, a tracking object 322a that is first designated by a user, and objects 322b and 322c that are regarded by the user as correct answers afterward are displayed as thumbnails. In addition, the currently watched point of time is displayed rectangular like an area 322d. An area 324 is an area that displays a computed candidate object. On the area 324, a candidate object computed by each of the surveillance cameras 200, 210, 220, and 230 is displayed for each of the surveillance cameras 200, 210, 220, and 230.

The panel 330, which performs reproduction and displays a map, includes a map unit 332 and a video reproduction unit 334. The map unit 332 is capable of switching displaying a map and displaying a time line. In the case where a map is displayed, a user repeats selecting a correct answer from candidate objects, and, as a result, a trajectory K of a tracking target is plotted onto the map. In the map, a camera icon is displayed at the position of each of the surveillance cameras 200, 210, 220, and 230, and the direction and angle of view of each of the surveillance cameras 200, 210, 220, and 230 are displayed. At the position of the camera icon of each of the surveillance cameras 200, 210, 220, and 230, in the case where a tracking target passes by the camera, the video at the time point where the tracking target is recognized is displayed as a thumbnail along with time. In addition, the trajectory of the moving tracking target is displayed as an arrow on the map, thereby facilitating the trajectory of the tracking target to be grasped. In addition, when a thumbnail on the map is selected, it is possible to check again a video of the corresponding surveillance camera in a time slot in which a target existed by causing the video reproduction unit 334 to reproduce it. It is possible to not only reproduce a video normally, but also reproduce a video reversely, fast forward a video, or fast rewind a video. In addition, it is possible to jump to the video at the point of time which corresponds to any position of the slider bar by selecting the position of the slider bar. In the video reproduction unit 334, it is possible to display a reproduction video of each of the surveillance cameras 200, 210, 220, and 230. A user is able to designate a key object with a frame 334a in a video displayed in the video reproduction unit 334.

In addition, when a key object appears in a video reproduced in the video reproduction unit 334 after the key object is designated, the frame 334a is displayed on the key object. In the case where the key object appears, only one frame 334a is displayed. However, when it is selected to display an object movement line on the screen, it is possible to display the trajectory of the moving key object on the image in accordance with the size and position of the object.

As described above, when a user reproduces a reproduction video of each of the surveillance cameras 200, 210, 220, and 230, the user is able to designate a key object according to a screen operation. The video management server 100 computes, on the basis of the designated key object, a candidate object similar to the key object from the a video captured by each of the surveillance cameras 200, 210, 220, and 230. The computed candidate objects are displayed on the panel 320, and a user is able to select a correct answer object a from the candidate objects displayed on the panel 320. Then, in each of the surveillance cameras 200, 210, 220, and 230, the trajectory K of the correct answer object is obtained from the time point where an image of the correct answer object is captured, and displayed on the panel 330. Note that a candidate object and a correct answer object will be described below.

3. Flow of Processing Performed in Surveillance Camera System

Figure 3:
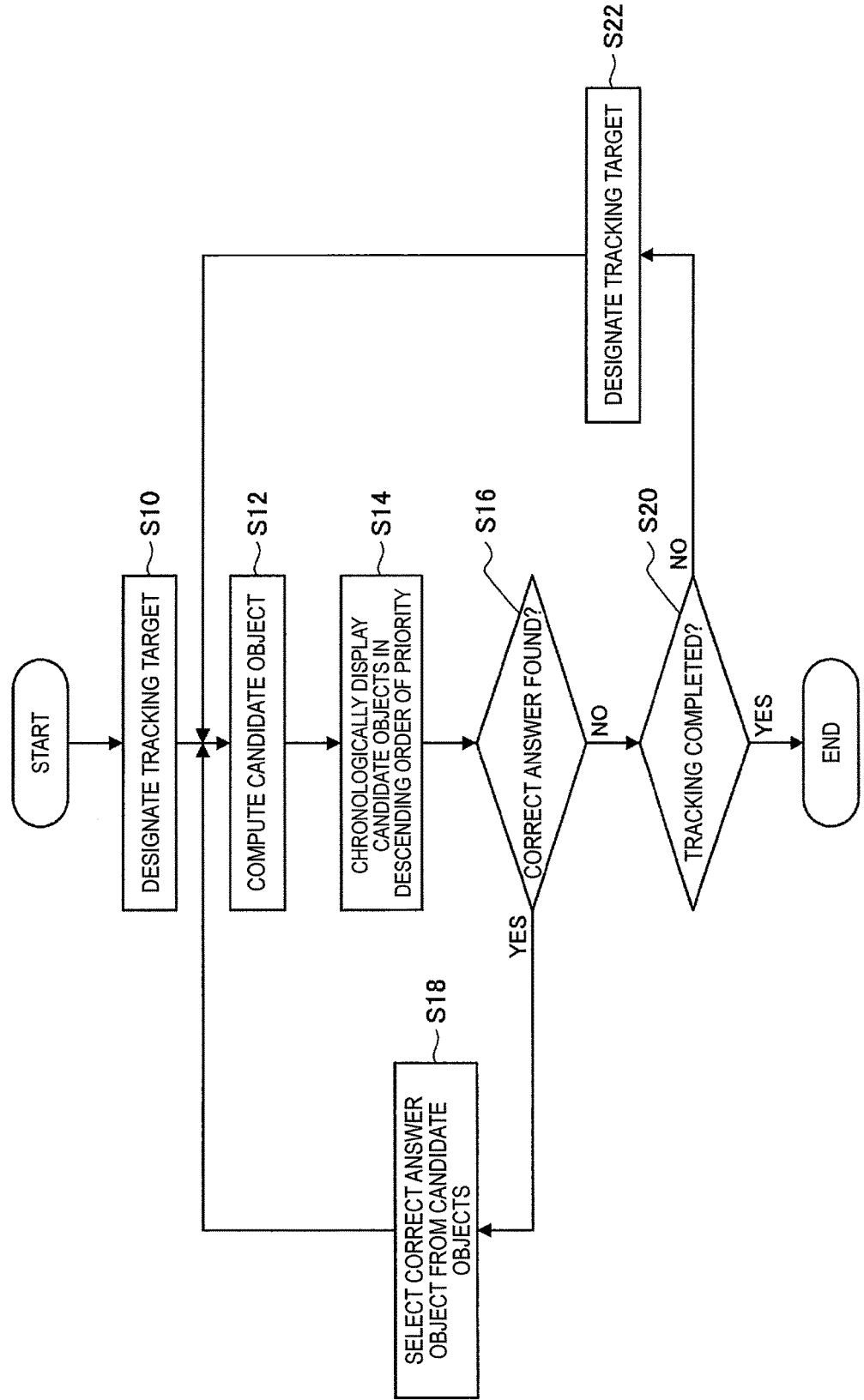
FIG. 3 is a flowchart illustrating an overall flow of tracking processing.

FIG. 3 is a flowchart illustrating the overall flow of tracking processing. First, in step S10, a user selects a key object that the user would like to track. Here, as an example, the user sets the frame 334a in the video displayed on the video reproduction unit 334, and is then able to designate a key object (tracking target object) that the user would like to track. In the case where, while the user is reproducing a video on the video reproduction unit 334 of the panel 330, the user finds a tracking target object, the user is able to designate the area with a rectangular frame 334a. This causes the tracking target object to be selected. The tracking target object is displayed on the panel 310.

When the tracking target object is designated, an object similar to the tracking target object is computed from videos recorded by the plurality of surveillance cameras 200, 210, 220, and 230 in next step S12. A group of objects presented as a result of the processing in step S12 are referred to as candidate objects. Note that computing a candidate object will be described in detail below. In addition, after this candidate object is computed, the candidate object is displayed on the panel 320.

In the panel 330, the positions of the surveillance cameras 200, 210, 220, and 230 are displayed on the map unit 332. A video captured by a surveillance camera selected from the surveillance cameras 200, 210, 220, and 230 is displayed on the video reproduction unit 334. In step S14, candidate objects are chronologically arranged on the panel 320 in descending order of priority. On the panel 320, candidate objects whose images are captured by the surveillance cameras 200, 210, 220, and 230 are chronologically displayed row by row from the left, and candidate objects having higher priority are displayed higher.

In step S16, a user himself or herself visually checks whether or not there is an object that seems to be the tracking target object among the candidate objects displayed on the panel 320. In the case where an object similar to the tracking target object is found among the candidate objects at this time, it is determined that a correct answer is found and the flow proceeds to step S18. In addition, that candidate object is selected as a correct answer object (similar object). The user designates a candidate object similar to the tracking target object on the panel 320, and is then able to select a correct answer object. After step S18, the flow proceeds to step S12. A candidate object similar to the tracking target object is computed again from the candidate objects whose images are captured after the selected correct answer object.

As described above, the processing from step S12 to step S18 is repeated until a candidate object matching the tracking target object is no longer found. In the case where no correct answer is found in step S16, the flow proceeds to step S20. It is determined whether or not tracking is completed. In the determination of step S20, it is checked on the basis of the map of the panel 330 and a reproduction video being reproduced whether or not tracking is completed. In the case where a tracking target is found in the reproduction video, the flow proceeds to step S22. A rectangular area (frame 334a) including the tracking target is designated to designate the tracking target object. Afterward, the flow proceeds to step S12. On the basis of the tracking target object designated in step S22, a candidate object is computed again after that point of time. This is repeated, and finished at the point of time when it is finally determined in step S20 that tracking is completed.

4. Processing Performed when Candidate Object is Computed

Figure 4:
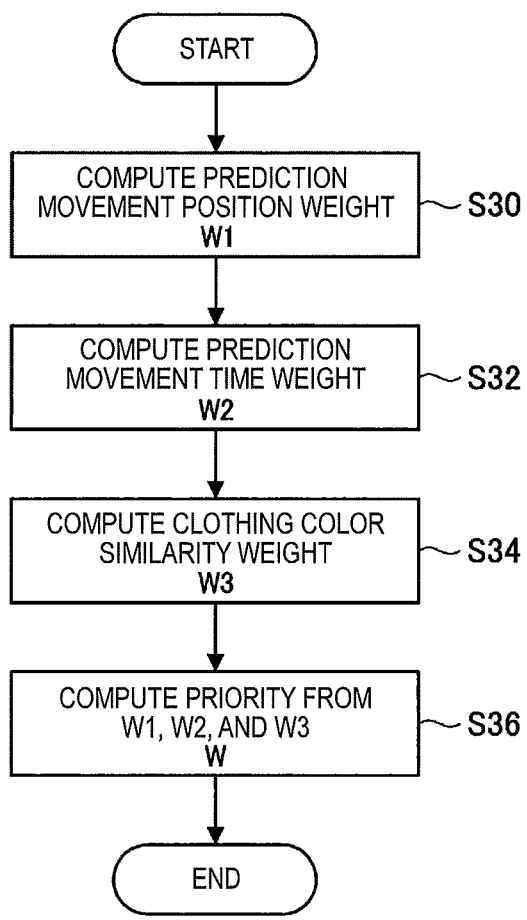
FIG. 4 is a flowchart illustrating an example of processing performed when a candidate object is computed.

Next, computing a candidate object will be described in detail. FIG. 4 is a flowchart illustrating an example of processing performed when a candidate object is computed. In the example of FIG. 4, priority is computed from the three perspectives "position," "time," and "clothing color" to compute a candidate object. First, in step S30, a prediction movement position weighting factor W1 is computed. Here, prediction movement speed and direction are computed from a video of a currently tracked entity, and a surveillance camera that shows the entity next is predicted to compute the weighting factor W1.

In step S32, a prediction movement time weighting factor W2 is computed. With respect to time, similarly to the processing in step S30, prediction movement speed and direction are computed from a video of a currently tracked entity, and time (time point) when the entity appears next is predicted to compute the weighting factor W2.

In step S34, a weighting factor W3 regarding similarity in clothing color is computed. With respect to a clothing color, on the basis of a tracking target object obtained by another surveillance camera, similarity in color to the clothing color of the clothing worn by a candidate object (culprit) is obtained and computed as the weighting factor W3.

Finally, in step S36, a weight is compositely computed from the weighting factors W1, W2, and W3, and output as priority W. On the basis of the priority W, a candidate object determined to be similar to the tracking target object is selected from a video captured by each of the surveillance cameras 200, 210, 220, and 230. In addition, the priority output here is used in step S14 of FIG. 3 to chronologically arrange candidate objects on the panel 320 in descending order of priority.

Note that, in the example of FIG. 4, priority is computed from the three points "position," "time," and "clothing color," or it is also possible to add other various elements such as face feature amount and clothing feature amount.

Figure 5:
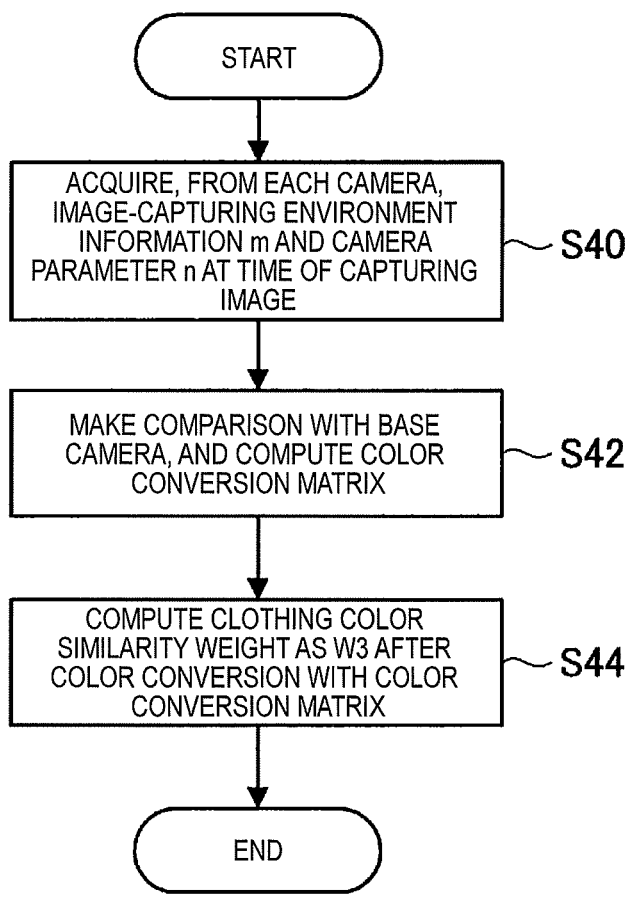
FIG. 5 is a flowchart illustrating an example of inter-camera color correction processing.

Next, in connection with the computation of the weighting factor W3 regarding similarity in clothing color which is performed in step S34 of FIG. 4, inter-camera color correction processing will be described that is automatically performed by the surveillance cameras 200, 210, 220, and 230 and the video management server 100 in cooperation with each other. FIG. 5 is a flowchart illustrating an example of inter-camera color correction processing. FIG. 5 illustrates processing performed in the video management server 100. Here, description will be made by setting one of the surveillance cameras 200, 210, 220, and 230 as a base camera that is a standard for hues, and setting the other surveillance cameras as peripheral cameras. First, in step S40, image-capturing environment information m (such as color temperature) of a surveillance camera that images a candidate object, and a camera parameter n at the time of capturing the image are acquired. In next step S42, the image-capturing environment information of the base camera and the peripheral cameras, and the camera parameters at the time of capturing images are acquired. A color conversion matrix for matching tints between the cameras is computed. In next step S44, the color conversion matrix obtained in step S42 is applied to camera videos of the peripheral cameras, and similarity in color to the tracking target object of the base camera is computed and output as the weighting factor W3. In this way, the weighting factors in step S34 of FIG. 4 are computed.

5. Regarding Color Conversion Matrix

In the present embodiment, as illustrated in FIG. 1, necessary image-capturing information (image-capturing environment information p1 to p4 and camera parameters q1 to q4 at the time of capturing images) is sent from each of the surveillance cameras 200, 210, 220, and 230 to the video management server 100 side, a color conversion matrix for each of the surveillance cameras 200, 210, 220, and 230 is created in the video management server 100, and the color conversion matrix is applied to a video received from each of the surveillance cameras 200, 210, 220, and 230, thereby matching the tints on the video management server 100 side. At this time, as described above, it is possible to match the tints of the peripheral cameras with the video of the base camera used as a standard.

Figure 6:
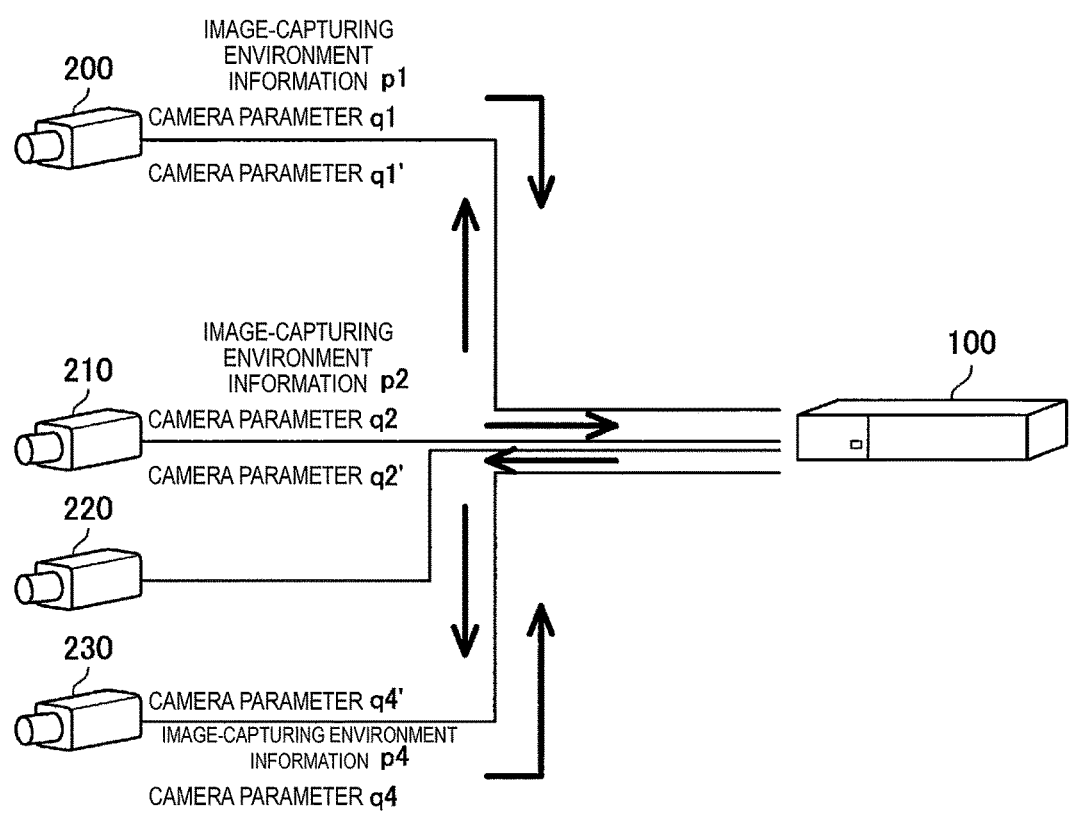
FIG. 6 is a schematic diagram illustrating an example in which a color conversion matrix is created in a video management server, and a camera parameter of each surveillance camera is converted on a basis of a result thereof such that tints of all cameras match each other when all the cameras capture images.

Meanwhile, as illustrated in FIG. 6, a color conversion matrix may be created in the video management server 100, and the camera parameters q1 to q4 of the respective surveillance cameras 200, 210, 220, and 230 may be converted into camera parameters q'1 to q'4 on the basis of a result thereof such that the tints of all the cameras are matched at the time of capturing images. In this case, a camera parameter n' of each of the surveillance cameras 200, 210, 220, and 230 is sent to each of the surveillance cameras 200, 210, 220, and 230 side, and the tints are automatically adjusted in the surveillance cameras 200, 210, 220, and 230.

The following expression (1) shows an example of a color matrix having three rows and three columns. The color matrix is a determinant used to implement color conversion, and corresponds to a color conversion matrix. Here, as an example, a color matrix having three rows and three columns is shown, but the color matrix may have five rows and five columns.

[Math. 1]

$$\begin{pmatrix} R' \\ G' \\ B' \end{pmatrix} = \begin{pmatrix} M_{11} & M_{12} & M_{13} \\ M_{21} & M_{22} & M_{23} \\ M_{31} & M_{32} & M_{33} \end{pmatrix} \begin{pmatrix} R \\ G \\ B \end{pmatrix} \quad (1)$$

Figure 7:
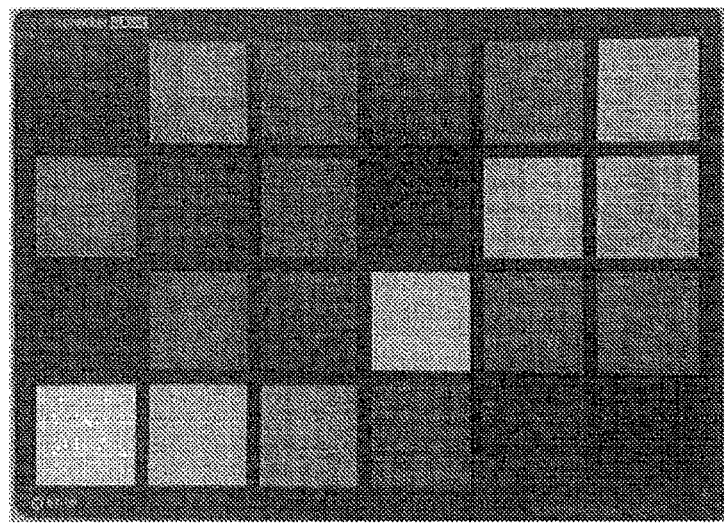
FIG. 7 is a schematic diagram illustrating an example of a hue in a case where a base camera captures an image of a specific color chart.
Figure 8:
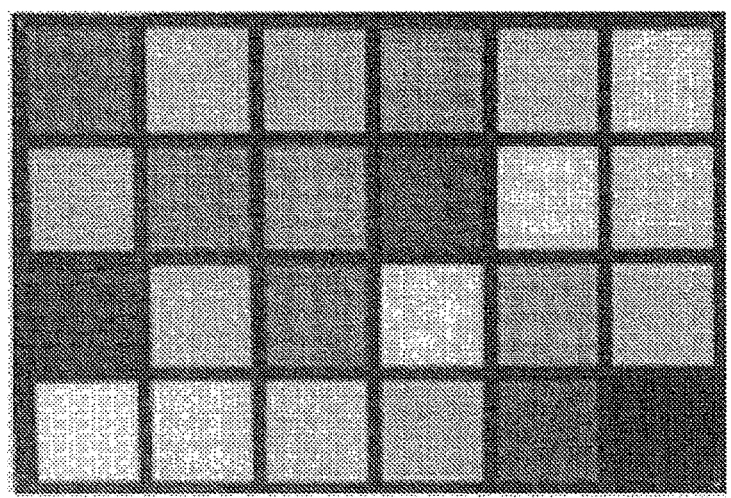
FIG. 8 is a schematic diagram illustrating an example of a hue in a case where a peripheral camera captures an image of a specific color chart.
Figure 9:
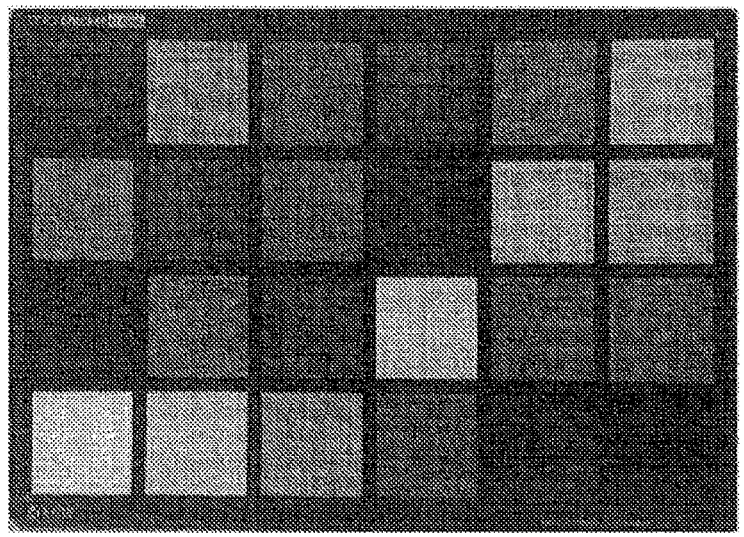
FIG. 9 is a schematic diagram illustrating an example of a hue obtained by converting, with a color conversion matrix, a hue in a case where a peripheral camera captures an image of a specific color chart.

For example, the case will be described where there are two cameras including a base camera and a peripheral camera A in different places, and the image-capturing situations differ in accordance with the installation environments, image-capturing time, or the like of the two cameras. A specific color chart shows hues as illustrated in FIG. 7 in the image-capturing environment of the base camera, and the same color chart sometimes shows totally different hues as illustrated in FIG. 8 from those of FIG. 7 in the image-capturing environment of the peripheral camera A. Note that FIGS. 7, 8, and 9 schematically illustrate differences in hues with differences in dot concentration. In this case, the hues of videos captured between the base camera and the peripheral camera A considerably change in the first place. Accordingly, even if objects whose images are captured by both cameras are the same entity, matching performed in the video management server 100 with color can result in low matching accuracy, and the entity can be regarded as different entities.

Therefore, in the present embodiment, a color conversion matrix is used to reconcile (adjust) colors between the cameras, thereby improving the accuracy. As an example, a simple operation example is shown that uses a 3×3 matrix. The colors acquired by the base camera are taken to be RBase, GBase, and BBase. The colors acquired by the peripheral camera A are taken to be RA, GA, and BA. To increase the matching accuracy with color in the video management server 100 in the downstream, it is desirable to satisfy RBase≈RA, GBase≈GA, and BBase≈BA if possible. However, as described above, some installation environments or situations of the cameras can cause color changes as illustrated in FIGS. 7 and 8 and offer RBase≠RA, GBase≠GA, and BBase≠BA even if images of entities having the same color are captured. Therefore, a color matrix (matrix having m11 to m33) as shown in the following expression (2) is used to convert the color acquired by the peripheral camera A, thereby obtaining RBase≈RA', GBase≈GA', and BBase≈BA'. As illustrated in FIG. 9, this makes it possible to change the colors acquired by the peripheral camera A into hues like those of the video captured by the base camera in FIG. 7, and improve the matching accuracy.

[Math. 2]

$$\begin{pmatrix} R_{Base} \\ G_{Base} \\ B_{Base} \end{pmatrix} \approx \begin{pmatrix} R'_A \\ G'_A \\ B'_A \end{pmatrix} = \begin{pmatrix} m_{11} & m_{12} & m_{13} \\ m_{21} & m_{22} & m_{23} \\ m_{31} & m_{32} & m_{33} \end{pmatrix} \begin{pmatrix} R_A \\ G_A \\ B_A \end{pmatrix} \quad (2)$$

The video management server 100 is capable of obtaining a color conversion matrix (color matrix (matrix having m11 to m33)) for the peripheral camera A on the basis of the colors RBase, GBase, and BBase acquired by the base camera, and the colors RA, GA, and BA acquired by the peripheral camera A. To create the color conversion matrix, images showing the same entity are used or images showing an entity having a known color are used as images of the base camera and the peripheral camera A. In the case where images showing the same entity are used in the base camera and the peripheral camera A, a color conversion matrix is created such that the colors of that entity are the same. In the case where the image of the peripheral camera A is used that shows an entity having a known color in the case where the base camera performs imaging, a color conversion matrix is created such that the same color in the case where the base camera performs imaging is obtained. Note that a plurality of color conversion matrices may be prepared in advance in accordance with environment information or parameters. In that case, the processing proceeds with step S42 of FIG. 5 interpreted as "prepare the corresponding color conversion matrix among a plurality of color conversion matrices prepared in advance."

6. Example of Component of Video Management Server 100

Figure 10:
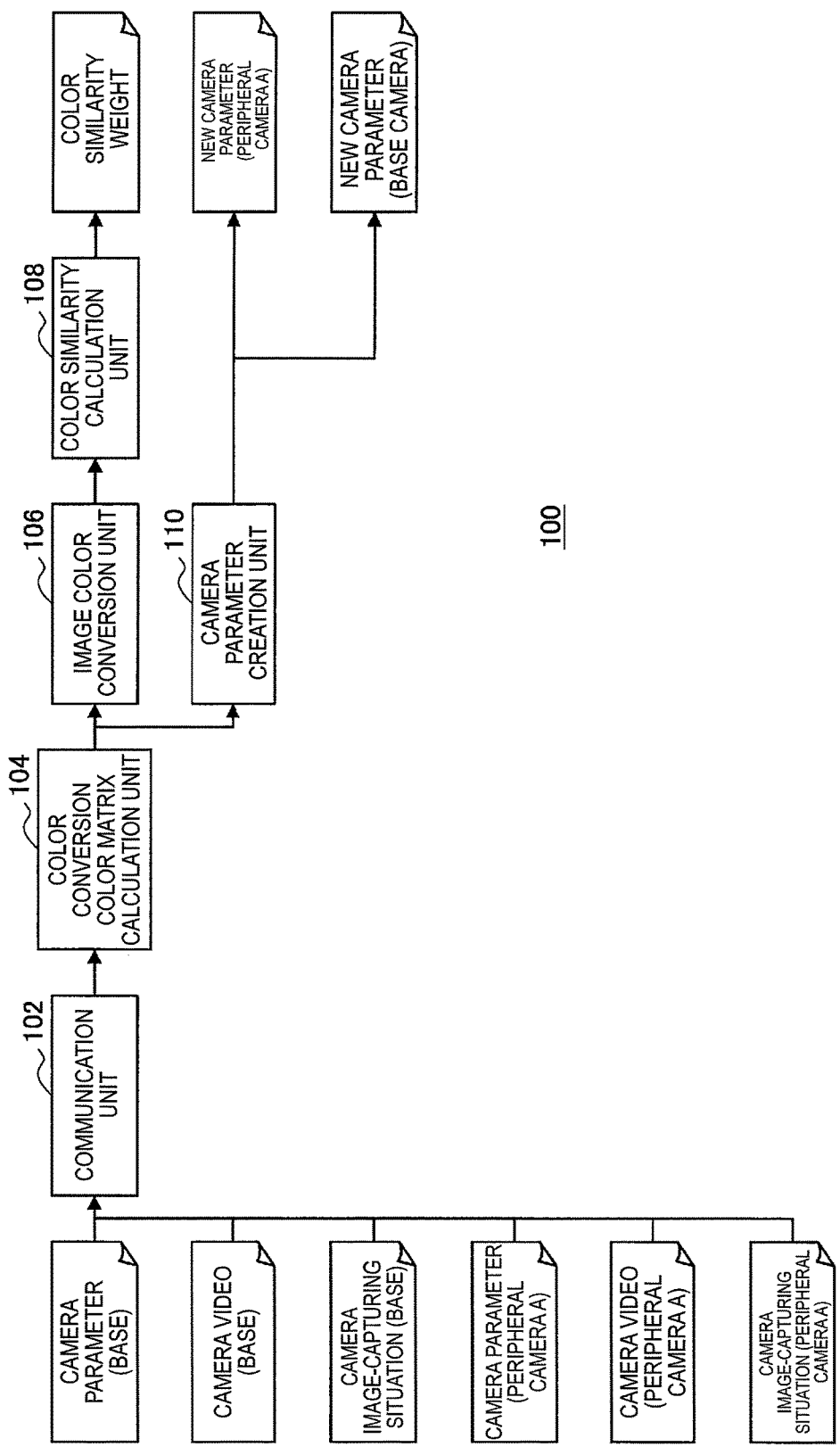
FIG. 10 is a schematic diagram illustrating a component of the video management server.

FIG. 10 is a schematic diagram illustrating components of the video management server 100. As illustrated in FIG. 10, the video management server 100 includes a communication unit 102, a color conversion color matrix calculation unit 104, an image color conversion unit 106, a color similarity calculation unit 108, and a camera parameter creation unit 110. The communication unit 102 receives image-capturing information such as a camera parameter of a base camera, a camera video of the base camera, and the image-capturing situation of the base camera which are sent from the base camera. In addition, the communication unit 102 receives a camera parameter of a peripheral camera, a camera video of the peripheral camera, and the camera image-capturing situation of the peripheral camera which are sent from the peripheral camera. Note that a camera parameter is, for example, a parameter such as a white balance value, and the camera image-capturing situation is a parameter such as the color temperature of a captured image. Note that each component illustrated in FIG. 10 can include a central processing unit such as a CPU and a program for causing the central processing unit to function. It is possible to store the program in a recording medium such as a memory.

The color conversion color matrix calculation unit 104 computes such a color matrix (matrix having m11 to m33) that satisfies RBase≈RA', GBase≈GA', and BBase≈BA' on the basis of various kinds of information sent from a base camera and a peripheral camera. The created color matrix is sent to the image color conversion unit 106. This color matrix is used to convert an image of the peripheral camera to approximate the hues of the base camera, and the image is output. The converted image of the peripheral camera is sent to the color similarity calculation unit 108. The similarity in color to a camera image of the base camera is computed, and the weighting factor W3 showing the color similarity is output. This processing adjusts the hues of even videos captured by different cameras in different environments between the cameras when matching is performed. Accordingly, it is possible to considerably increase the color similarity determination accuracy.

In addition, as another technique, it is also possible to create a camera parameter of each of the surveillance cameras 200, 210, 220, and 230 on the video management server 100 side as illustrated in FIG. 6, and reflect this in each of the surveillance cameras 200, 210, 220, and 230, thereby matching the colors of videos themselves at the time of camera image-capturing. As processing in this case, the camera parameter creation unit 110 in FIG. 10 computes such a new camera parameter that matches hues between cameras in advance at the time of capturing an image from the color matrix output from the color conversion color matrix calculation unit 104, the camera parameter of each of the surveillance cameras 200, 210, 220, and 230, and the camera image-capturing situation, and outputs the computed camera parameter. With this arrangement, as a camera parameter, at least a camera parameter of the peripheral camera is output. In addition, in the case where a camera parameter of the peripheral camera alone is not sufficient for adjustment, a new camera parameter of the base camera is output.

7. Example of Component of Surveillance Camera

Figure 11:
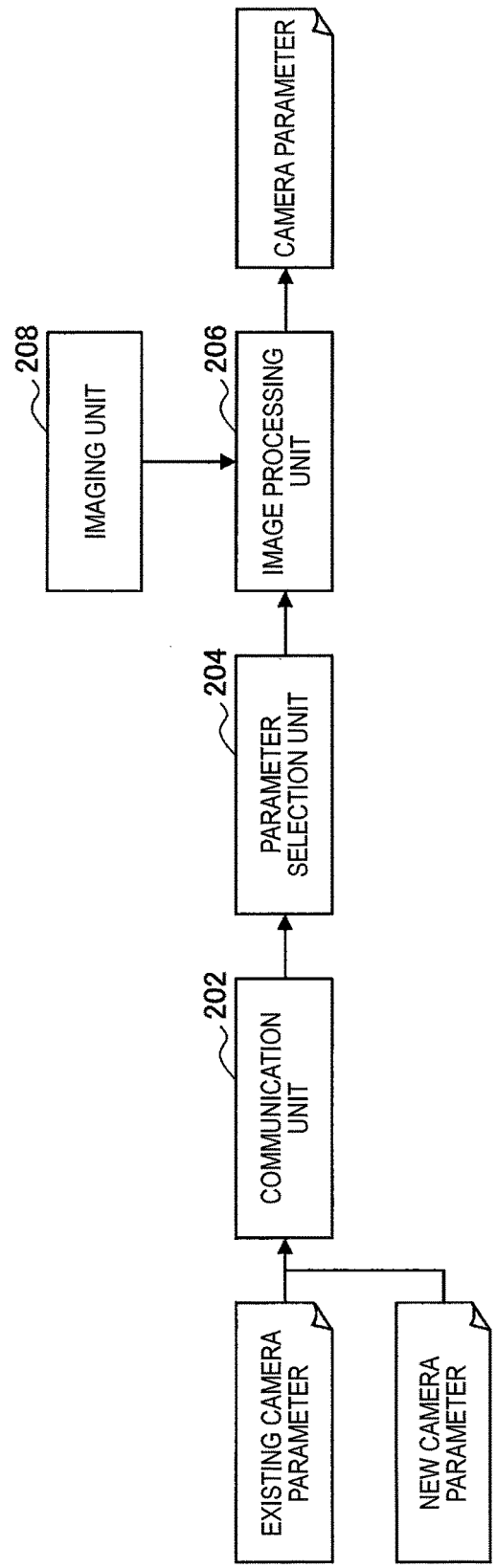
FIG. 11 is a schematic diagram illustrating a component of each surveillance camera.

FIG. 11 is a schematic diagram illustrating components of each of the surveillance cameras 200, 210, 220, and 230 (base camera and peripheral cameras). As illustrated in FIG. 11, each of the surveillance cameras 200, 210, 220, and 230 includes a communication unit 202, a parameter selection unit 204, an image processing unit 206, and an imaging unit 208. A new camera parameter created in the camera parameter creation unit 110 of the video management server 100 is sent from the communication unit 102 to the base camera and the peripheral cameras. The communication units 202 of the base camera and the peripheral cameras each receive the new camera parameter. The parameter selection unit 204 combines an existing camera parameter with the new camera parameter, and reconciles the two parameters to cause the camera parameter to change and match colors between the cameras. Note that, with respect to reflecting of the parameter, the base camera and the peripheral cameras can also perform the same operation.

The newly computed camera parameter is sent to the image processing unit 206. The image processing unit 206 performs image processing on image information acquired by the imaging unit (image sensor) 208 performing imaging, on the basis of the camera parameter. With this arrangement, the image information is corrected with the camera parameter, and it is possible to adjust the hues in each of the surveillance cameras 200, 210, 220, and 230.

8. Example of Component for Computing Similar Object

Figure 12:
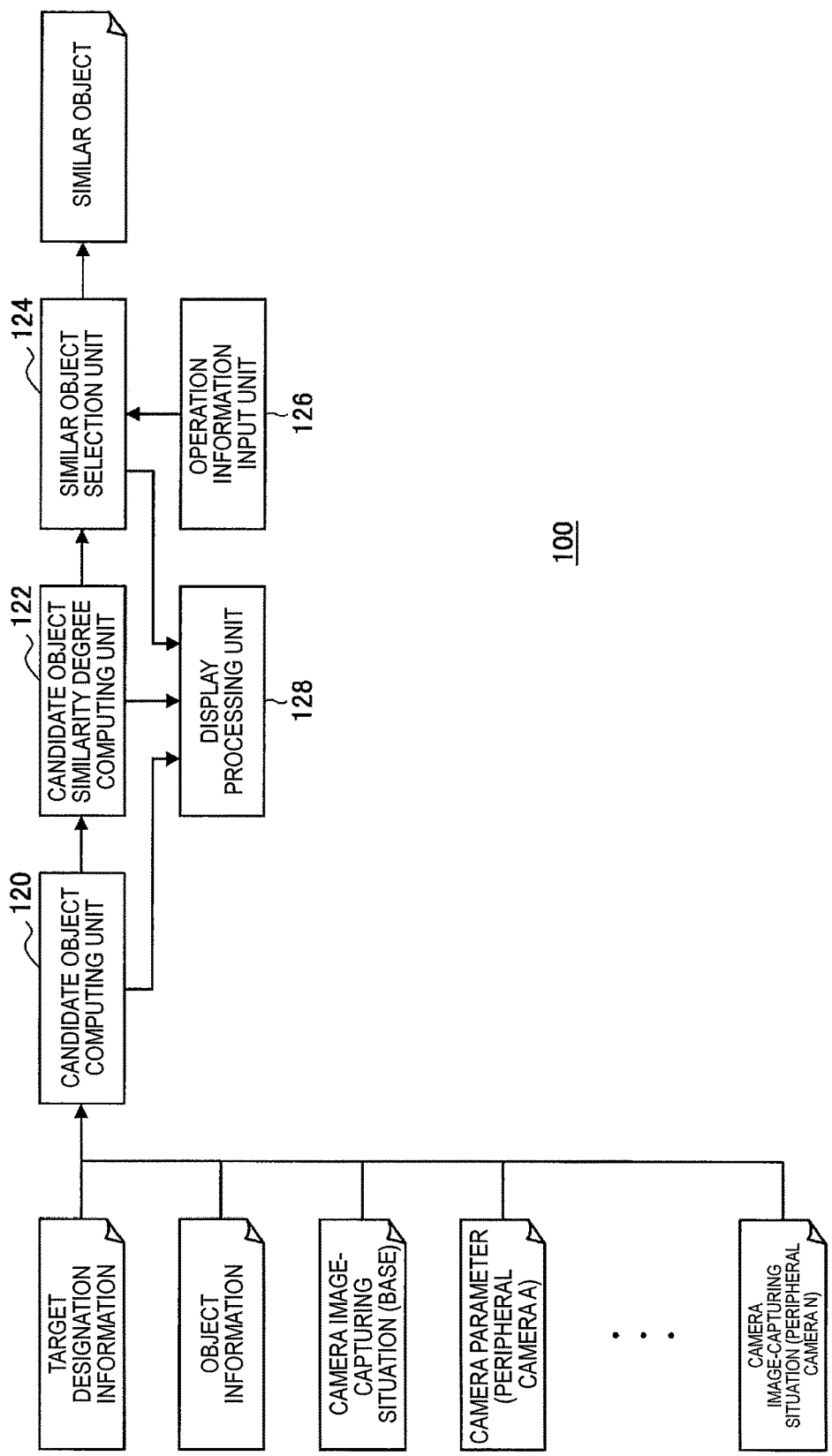
FIG. 12 is a schematic diagram illustrating a component that computes a similar object among components of the video management server.

FIG. 12 is a schematic diagram illustrating a component that computes a similar object among components of the video management server 100. As illustrated in FIG. 12, the video management server 100 includes a candidate object computing unit 120, a candidate object similarity degree computing unit 122, a similar object selection unit 124, and an operation input unit 126. The candidate object computing unit 120 computes the priority W in accordance with the processing of FIG. 4, and computes a candidate object determined to be similar to a tracking target object from a video captured by each of the surveillance cameras 200, 210, 220, and 230. Note that each of components illustrated in FIGS. 11 and 12 can also include a central processing unit such as a CPU and a program for causing the central processing unit to function. It is possible to store the program in a recording medium such as a memory.

The candidate object similarity degree computing unit 122 computes the degree of similarity between the tracking target object and the candidate object on the basis of the priority W. In the case where a user finds a candidate object similar to the tracking target object, operation information corresponding to an instruction of the user is input into the operation information input unit 126 from a mouse, a keyboard, a touch pad (touch sensor), or the like. In the case where a user finds a candidate object similar to the tracking target object, the similar object selection unit 124 selects the candidate object as a similar object in accordance with an instruction of the user (step S18 of FIG. 3). The display processing unit 128 performs processing for displaying the computed candidate object as illustrated in FIG. 2. In addition, the display processing unit 128 performs processing for display on the panel 320 in FIG. 2 on the basis of the time when an image of the candidate object is captured, and the degree of similarity (priority W) between the tracking target object and the candidate object (step S14 in FIG. 3).

As described above, according to the present embodiment, it is possible to optimally adjust the hues of videos captured by the plurality of surveillance cameras 200, 210, 220, and 230. It is thus possible to extract a candidate object similar to a tracking target object with high accuracy.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a reception unit configured to receive image-capturing information from each of a plurality of imaging apparatuses; and a color conversion information calculation unit configured to calculate, on a basis of the received image-capturing information, color conversion information for matching hues of the plurality of imaging apparatuses.

(2)

The information processing apparatus according to (1), further including:

an image color conversion unit configured to use the color conversion information for each of the plurality of imaging apparatuses to convert hues of images captured by the plurality of imaging apparatuses.

(3)

The information processing apparatus according to (1) or (2), in which the color conversion information calculation unit uses a hue of a specific imaging apparatus among the plurality of imaging apparatuses as a standard, and calculates, on a basis of a hue of another imaging apparatus other than the specific imaging apparatus and the hue of the specific imaging apparatus, the color conversion information for each of the plurality of imaging apparatuses.

(4)

The information processing apparatus according to any of (1) to (3), further including:

an imaging parameter creation unit configured to create, on a basis of the color conversion information for each of the plurality of imaging apparatuses, an imaging parameter regarding imaging of each of the plurality of imaging apparatuses; and a transmission unit configured to transmit the imaging parameter to each of the plurality of imaging apparatuses to allow the plurality of imaging apparatuses to perform imaging with the imaging parameter.

(5)

The information processing apparatus according to any of (1) to (4), in which the image-capturing information includes image-capturing environment information regarding an image-capturing environment when each of the plurality of imaging apparatuses captures an image, and a parameter regarding image-capturing which is specific to each of the plurality of imaging apparatuses.

(6)

The information processing apparatus according to any of (1) to (5), further including:

a candidate object computing unit configured to compute, on a basis of a hue of a tracking target object whose image is captured by any of the plurality of imaging apparatuses, a candidate object similar to the tracking target object from an image captured by at least any of the plurality of imaging apparatuses.

(7)

The information processing apparatus according to (6), further including:

a display processing unit configured to perform, on a basis of a degree of similarity between the tracking target object and the candidate object, processing for displaying a list of the candidate objects.

(8)

An information processing method including:

receiving image-capturing information from each of a plurality of imaging apparatuses; and calculating, on a basis of the received image-capturing information, color conversion information for matching hues of the plurality of imaging apparatuses.

(9)

A program for causing a computer to function as:

a means for receiving image-capturing information from each of a plurality of imaging apparatuses; and a means for calculating, on a basis of the received image-capturing information, color conversion information for matching hues of the plurality of imaging apparatuses.

REFERENCE SIGNS LIST 100 video management server
102 communication unit
104 color conversion color matrix calculation unit

The invention claimed is:

1. An information processing apparatus comprising:
circuitry including a processor and a memory, the circuitry configured to:
receive image-capturing information from each of a plurality of imaging apparatuses;
determine a color conversion matrix based on the received image-capturing information for matching hues of the plurality of imaging apparatuses, the color conversion matrix including a plurality of rows and columns;
convert a first color matrix of a candidate object acquired by a first imaging apparatus of the plurality of imaging apparatuses to a second color matrix by multiplying the first color matrix with the color conversion matrix;
determine a color similarity between the second color matrix and a third color matrix of a target object captured by a second imaging apparatus of the plurality of imaging apparatuses; and
compute a priority of the candidate object based on the determined color similarity.

2. The information processing apparatus according to claim 1, wherein the circuitry is further configured to use the color conversion matrix for each of the plurality of imaging apparatuses to convert hues of images captured by the plurality of imaging apparatuses.

3. The information processing apparatus according to claim 1, wherein the circuitry is further configured to use a hue of a specific imaging apparatus among the plurality of imaging apparatuses as a standard, and calculate, based on another hue of another imaging apparatus other than the specific imaging apparatus and the hue of the specific imaging apparatus, the color conversion matrix for each of the plurality of imaging apparatuses.

4. The information processing apparatus according to claim 1, wherein the circuitry is further configured to create, based on the color conversion matrix for each of the plurality of imaging apparatuses, an imaging parameter regarding imaging of each of the plurality of imaging apparatuses; and
transmit the imaging parameter to each of the plurality of imaging apparatuses to allow the plurality of imaging apparatuses to perform imaging with the imaging parameter.

5. The information processing apparatus according to claim 1, wherein
the image-capturing information includes image-capturing environment information regarding an image-capturing environment when each of the plurality of imaging apparatuses captures an image, and a parameter regarding image-capturing which is specific to each of the plurality of imaging apparatuses.

6. The information processing apparatus according to claim 1, wherein the circuitry is further configured to compute, based on a hue of a tracking target object whose image is captured by any of the plurality of imaging apparatuses, the candidate object similar to the tracking target object from an image captured by at least any of the plurality of imaging apparatuses.

7. The information processing apparatus according to claim 6, wherein the circuitry is further configured to perform, based on a degree of similarity between the tracking target object and the candidate object, processing for displaying a list of candidate objects.

8. An information processing method comprising:
receiving image-capturing information from each of a plurality of imaging apparatuses;
determining a color conversion matrix based on the received image-capturing information for matching hues of the plurality of imaging apparatuses, the color conversion matrix including a plurality of rows and columns;
converting a first color matrix of a candidate object acquired by a first imaging apparatus of the plurality of imaging apparatuses to a second color matrix by multiplying the first color matrix with the color conversion matrix;
determining a color similarity between the second color matrix and a third color matrix of a target object captured by a second imaging apparatus of the plurality of imaging apparatuses; and
computing a priority of the candidate object based on the determined color similarity.

9. A non-transitory computer readable medium storing computer readable instructions thereon that, when executed by a computer, causes the computer to perform a method comprising:
receiving image-capturing information from each of a plurality of imaging apparatuses;
determining a color conversion matrix based on the received image-capturing information for matching hues of the plurality of imaging apparatuses;
converting a first color matrix of a candidate object acquired by a first imaging apparatus of the plurality of imaging apparatuses to a second color matrix by multiplying the first color matrix with the color conversion matrix;

determining a color similarity between the second color matrix and a third color matrix of a target object captured by a second imaging apparatus of the plurality of imaging apparatuses; and computing a priority of the candidate object based on the determined color similarity.

\* \* \* \* \*